(12) United States Patent
Llorente Gonzalez

(10) Patent No.: US 8,081,414 B2
(45) Date of Patent: Dec. 20, 2011

(54) LIGHTING PROTECTION SYSTEM FOR WIND GENERATORS

(75) Inventor: Jose Ignacio Llorente Gonzalez, Pamplona (ES)

(73) Assignee: Gamesa Innovation & Technology, S.L., Zamudio (Vizcaya) (ES)

( * ) Notice: Subject to any disclaimer, the term of this patent is extended or adjusted under 35 U.S.C. 154(b) by 322 days.

(21) Appl. No.: 11/989,707

(22) PCT Filed: Jul. 14, 2006

(86) PCT No.: PCT/ES2006/000408
§ 371 (c)(1),
(2), (4) Date: Apr. 1, 2010

(87) PCT Pub. No.: WO2007/017534
PCT Pub. Date: Feb. 15, 2007

(65) Prior Publication Data
US 2010/0188790 A1 Jul. 29, 2010

(30) Foreign Application Priority Data
Aug. 1, 2005 (ES) .................................. 200501907

(51) Int. Cl.
*H01H 47/00* (2006.01)
*H05F 3/00* (2006.01)
(52) U.S. Cl. ...................................................... 361/220
(58) Field of Classification Search .................... 361/220
See application file for complete search history.

(56) References Cited

U.S. PATENT DOCUMENTS

| 4,625,256 | A  | * | 11/1986 | Scuka et al. ................... 361/117 |
| 6,612,810 | B1 | * | 9/2003  | Olsen et al. ....................... 416/95 |
| 7,249,935 | B2 | * | 7/2007  | Pedersen ..................... 416/146 R |
| 7,377,750 | B1 | * | 5/2008  | Costin et al. ............... 416/146 R |
| 7,390,169 | B2 | * | 6/2008  | Larsen et al. .............. 416/146 R |
| 7,502,215 | B2 | * | 3/2009  | Krug et al. ...................... 361/220 |
| 2006/0013695 | A1 | * | 1/2006 | Pedersen ...................... 416/248 |
| 2007/0009361 | A1 | * | 1/2007 | Moller Larsen et al. . 416/146 R |

FOREIGN PATENT DOCUMENTS

| EP | 1 036 937   | 9/2000  |
| ES | 2 230 285   | 5/2005  |
| WO | 2004/001224 | 12/2003 |
| WO | 2005/050008 | 6/2005  |

* cited by examiner

*Primary Examiner* — Ronald W Leja
(74) *Attorney, Agent, or Firm* — Ladas & Parry LLP

(57) ABSTRACT

The invention relates to a lightning transmission element (1) which is fixed to a hub (21) of a wind generator and which is formed by a first conductor bar (2) which is fixed to a second insulating bar (5). According to the invention, a first end (4) of the lightning transmission element (1) is positioned opposite a metal strip (18) that is disposed at the root of each blade (10) of the wind generator at a first distance which enables a flashover of incident lightning at a point on a blade (10) of the wind generator, while a second end (3) thereof is positioned opposite a gutter (12) of a nacelle (13) of the wind generator at a second distance which enables a lightning flashover. The lightning is conveyed from the point on the blade (10) at which it is incident thereon to the earth through a series of conduction means including the lightning transmission element (1), said means preventing the lightning from striking the sensitive parts of the wind generator.

14 Claims, 2 Drawing Sheets

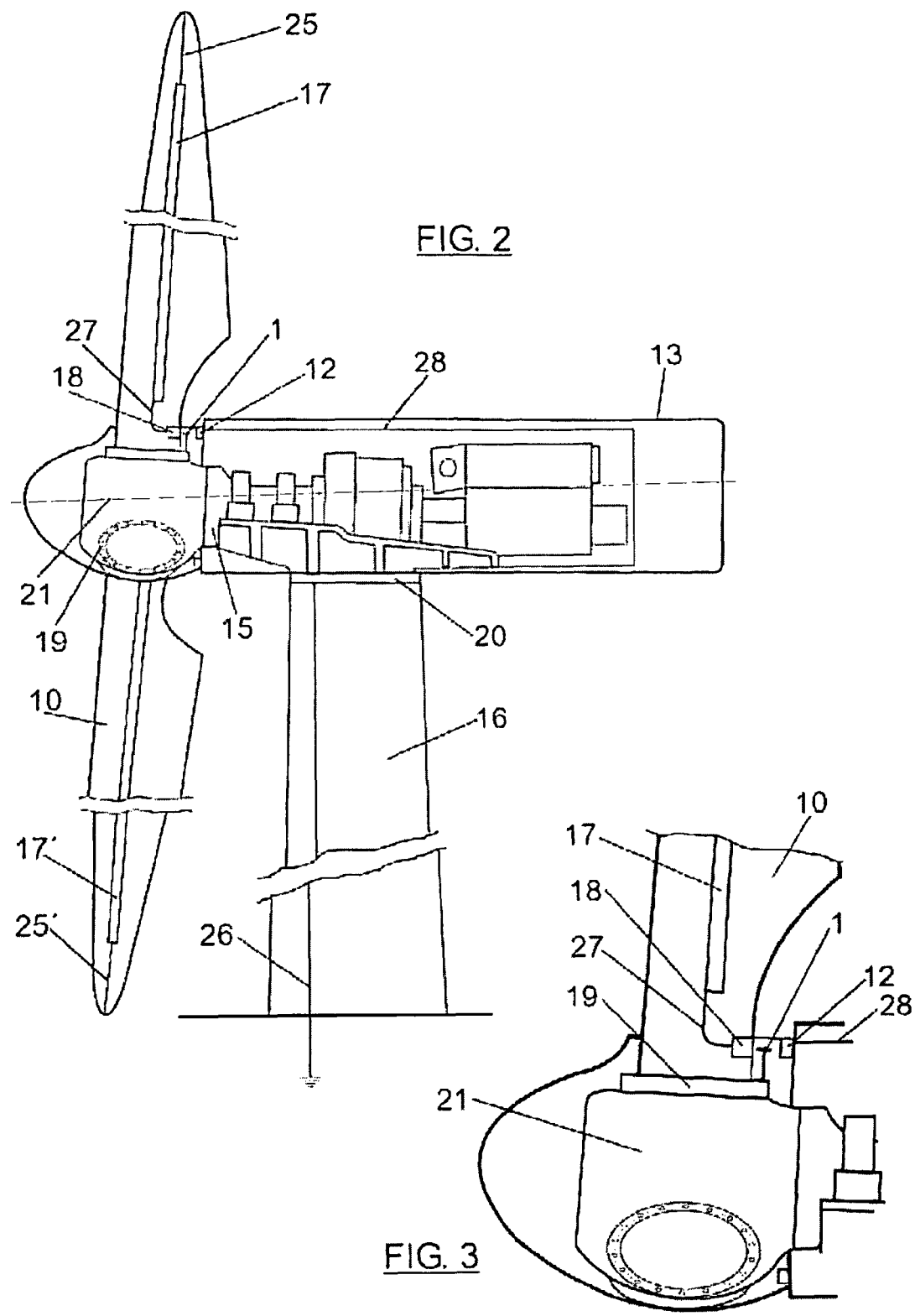

LIGHTING PROTECTION SYSTEM FOR WIND GENERATORS

FIELD OF THE INVENTION

This invention refers to a non-contact lightning transmission system configured to be installed on a wind turbine. This system enables the vital parts of the wind turbine to be protected against lightning, thus reducing the need for wind turbine maintenance.

STATE OF THE ART

The sector to which the technique of the invention belongs is that of wind turbine lightning protection.

Wind turbines used in the recovery of wind energy need to be located in points that are unprotected from meteorological conditions in order to take full advantage of the wind. The sitting of wind turbines in said exposed areas and the geometry of the wind turbines themselves means that there is a high probability of attracting lightning.

One system used to protect the components of the wind turbine against lightning impacts consists of directing the discharge from the tip of the blade to earth, by firstly using an internal cable that joins the tip of the blades with an internal stiffening beam. The lightning then reaches the hub through the blade bearing and is conveyed to the main shaft. It then arrives at the frame through the bearings and, finally, the discharge is conveyed to earth through the yaw ring that joins the frame with the tower.

Discharging lightning using this route causes damage to the bearings and the main shaft, thus leading to alternative solutions being sought.

Document EP 1036937 describes a lightning protection system comprised of a conductor ring located on the blades of the wind turbine and a non-linear resistance located on the upper point of the outside of the nacelle so that it produces an electrical arc between the ring and the resistance. This arrangement means that the electrical arc is only produced when the blade receiving the lightning is exactly in the vertical position. In addition, the resistance is located in a place that is difficult to access and is therefore difficult to replace in the event that it is damaged by lightning.

Other systems are known, such as the system detailed in document EP 0718495, that creates a structure outside the nacelle which complicates construction and negatively affects the aerodynamics of the wind turbine.

INVENTION DISCLOSURE

In order to overcome the disadvantages in the state of the art, a new, more efficient and safer lightning transmission system has been designed whereby all of the lightning that impacts on the tip of one of the wind turbine blades is routed to earth through the nacelle structure, thus preventing it from passing through the blade bearings and the main shaft. In addition, this solution is easy to maintain and does not affect wind turbine operation.

With the new solution, as with the traditional system, the lightning travels through some second conduction means from the tip of a blade to a stiffening beam that constitutes the central core of said blade. Some third conduction means convey the lightning from the stiffening beam to a yaw ring of a nacelle through the structure of said nacelle and, finally, some fourth conduction means convey the lightning to earth from the yaw ring and along a wind turbine tower. Generally, both the second and the fourth conduction means will include an internal conductor cable.

The third conduction means, in accordance with this invention, include a first conductor leading from the stiffening bean to a metal band located at the blade root, and a second conductor leading from a gutter of the nacelle to the yaw ring via the structure of said nacelle. Both the first and the second conductor can be comprised of an internal metal cable.

In a novel manner, the lightning passes with a flashover from the metal band to a non-contact lightning transmission element, and the transmission element fires another discharge which directly reaches the gutter of the nacelle, from where the fourth conduction means will route it.

The complexity of the invention lies in the passing of the lightning from a mobile part (rotor) to another fixed part (nacelle), given that it is essential to prevent any contact between them in order to decrease wear or risk of damage to the parts. With this invention, a distance between the lightning transmission element in relation to the root blade and the gutter is guaranteed to be between 8 and 15 mm at all times, although the range of acceptable values is greater (between 0.5 to 30 mm). This separation is sufficient to prevent any collisions between the lightning transmission element and other parts of the wind turbine which have relative movement in relation to said lightning transmission element, whilst also being sufficiently small to guarantee the flashover in the event of a lightning impact.

Another advantage of the system of this invention is that it reduces the damage to the gutter and blade root materials, during discharges of both long and short duration; whilst at the same time, it also prevents the discharge from reaching the control cabinet of the hub as it suppresses the passage of current through the bearings. Another advantage of this invention is the simplicity with which it can be replaced in the event of damage after various lightning discharges.

The lightning transmission element comprises some first conduction means which in turn comprise a first bar of a conductor material. Said first bar has one first end with a first front surface situated opposite the metal band at a distance of between 0.5 and 30 mm, preferably between 8 and 15 mm, in order to enable a flashover.

The first band also has a second end with a second front surface placed opposite the gutter of the wind turbine nacelle, at a second distance from said gutter which will ensure the electrical flashover, with said second distance being between 0.5 and 30 mm, and preferably between 8 and 15 mm.

The first bar of the lightning transmission element is supported by a second bar of electrical insulation material capable of withstanding a temperature generated by a flashover. This second bar is equipped with a first section where fixture devices for connection to the wind turbine are located, which according to one embodiment of the invention, will be a connection base plate with a basically dihedral shape; and a second portion which includes some second fixture devices to secure the first bar to the second in a notably perpendicular position.

In an advantageous embodiment of the invention, both the first end and the second end of the first bar are removable to facilitate replacement in the event of damage after successive lightning discharges.

In another advantageous embodiment, the first conduction means are made of copper or steel or a combination of the same. For example, both ends of the first bar may be made of copper with the central part made of steel.

DESCRIPTION OF THE DRAWINGS

The following figures are included to provide a better understanding of the invention:

FIG. 2: general view of a wind turbine.
FIG. 3: detailed view of the rotor of a wind turbine.

DESCRIPTION OF AN EMBODIMENT

Figure 1:
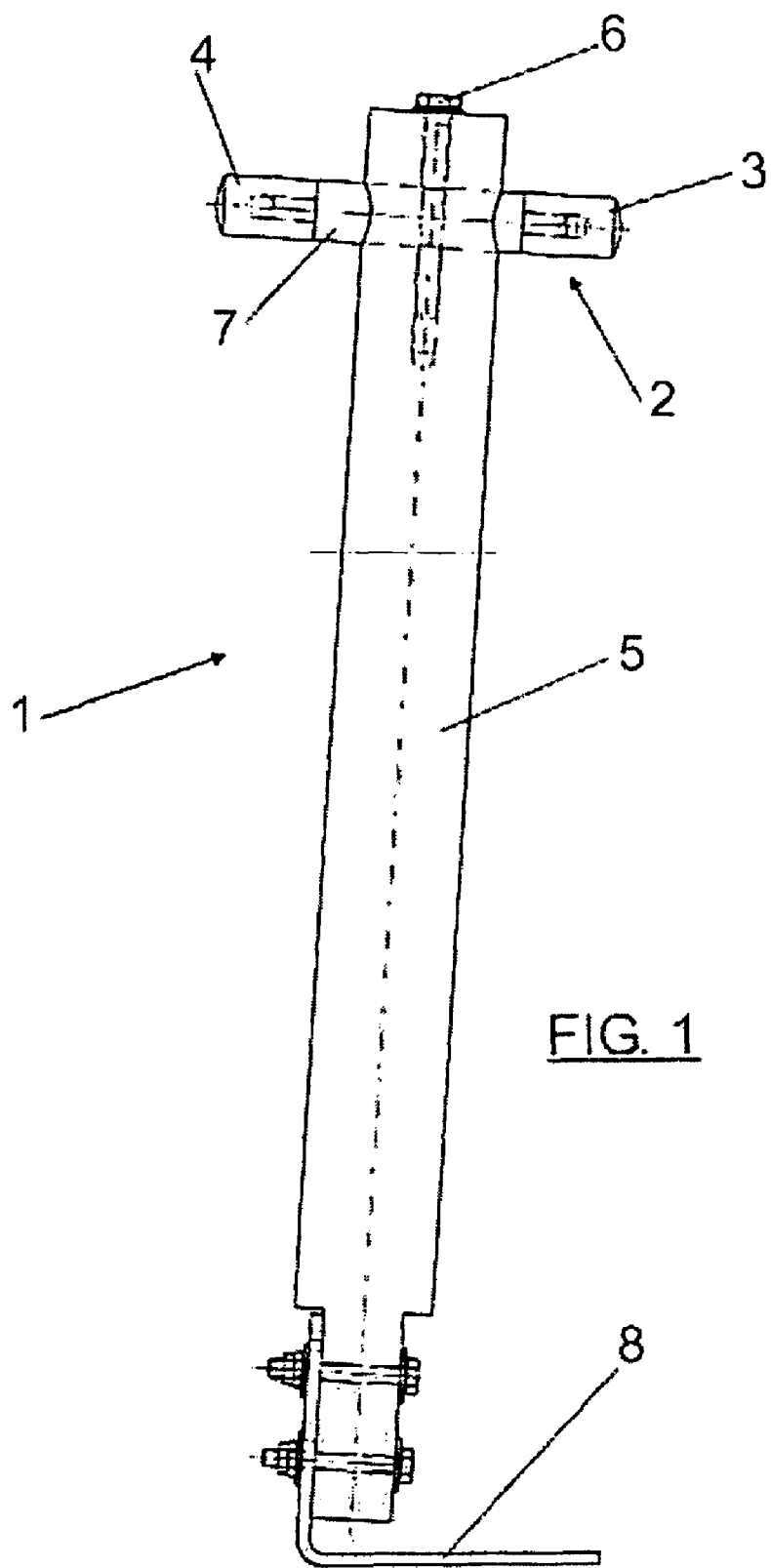
FIG. 1: elevation of a lightning transmission element.

Here follows a brief description of an embodiment of the invention provided for illustration purposes, thus the invention is not limited to said embodiment.

FIG. 1 shows a lightening transmission element (1) formed by two bars (2, 5) crossed in a T and a base plate (8). A first bar (2) of conductor material is situated perpendicularly to a second bar (5) of insulating material in the proximity of the upper end of said second bar (5), a base plate (8) is fixed on one side to the bottom end of the bar (5) and on the other side to a wind turbine blade bearing (19).

The first bar (2) is formed by three parts: a first end (4), a second end (3) and a central part (7). The two ends (3, 4) can be removed from the central part (7) in order to be replaced in the event that they are affected by a lightning discharge. For this purpose there are threaded holes inside both ends (3, 4) to enable connection to threaded shafts joined to the central part (7). Other fixture methods may be used without straying from the field of the invention.

The central part (7) contains a hole at the centre which passes transversally to a longitudinal shaft of the first bar (2), said hole is aligned with a hole drilled lengthways in the second bar (5) for a screw (6) or similar part to be inserted and both bars (2, 5) connected.

Both ends (3, 4) of the first bar may be made of any conductor material, but the ends (3,4) are preferably made of copper given its high level of conductivity. The central part (7) is preferably made of steel, although it may also be made of copper or any other conductor material. In cases where the central part (7) is made of copper, the first bar (2) may be manufactured as one sole part. However, in cases of damage, if the bar (2) is only one part then the entire bar (2) must be replaced instead of just the ends (3, 4).

The second bar (5) is made of an insulating material, preferably Nylon. And the base plate (8) to which the second bar (5) and the blade root (19) are connected, is preferably made of steel.

The lightning transmission element (1) can be installed on a wind turbine as shown in FIG. 2, which can be seen in detail in FIG. 3. The wind turbine is comprised of a series of blades (10) upon which the wind impacts, each of which is connected to a blade bearing (19) to enable rotation around a longitudinal axis of the blade (10), said rotation is commonly known as "pitch". The blade bearing (19) is connected to a main shaft (15) which carries the rotation movement of the rotor, to which the blades (10) are connected, to a gearbox which changes the angular rotation speed, and from there to an electrical generator.

The interior of each blade (10) contains a stiffening beam (17) which helps to maintain the blade (10) straight under the action of the wind, with a conductor material, generally metal, is placed upon this stiffening beam (17) to help transmit lightning which may hit a wind turbine blade (10).

The lightning is transmitted by following the route detailed below:

The lightning impacts a tip of the blade (10) from where it is transmitted through some second conduction means (25) to the stiffening beam (17) which has a conductor material on it that conveys the lightning by means of a first conductor (27) to a metal band (18) located at the blade root at a certain distance from the blade bearing (19). This distance coincides with the height of the first bar (2) in relation to the base plate (8) which is fixed on one side to the blade bearing (19), and the position of the gutter (12) of the nacelle (13).

A flashover takes places from the metal band (18) to the first end (4) of the first bar (2) of a lightning transmission element (1) fixed to the outer part of the blade bearing (19). For this purpose, the metal band (18) is made from a metal plate disposed on the side surface of the blade (10), so that when the blade pitches there is always a part of the plate opposite the first end (4) of the first bar (2).

The lightning passes lengthways through the first bar (2) and reaches the second end (3) from where a flashover takes place to the gutter (12) of the nacelle (13).

The current follows a second conductor (28) situated on the nacelle (13) without passing through any delicate parts of the wind turbine, such as the blade bearing (19), the control cabinet of the hub, the bearings of the main shaft, the gearbox or the generator, and reaches a yaw ring (20) of the wind turbine.

Finally, the lightning is conveyed from the yaw ring (20) to earth through some fourth conduction means (26) situated along a wind turbine support tower (16).

The lightning follows this route when the blade (10) is made of fibre glass or carbon fibre, materials which provide electrical insulation to prevent the lightning passing from the blade (10) to the blade bearing (19).

The first bar (2) is made with a greater section that the bar with the conductors arranged along the rest of the route to ensure that the temperature reached due to the electrical resistance of the material is reduced.

The first end (4) of the first bar (2) is located at a distance of between 0.5 and 30 mm, preferably between 8 and 15 mm. Thus forcing the lightning to flashover from the metal band (18) to the first end (4) instead of to the blade bearing (19), as the latter is located at a much greater distance. Therefore, a flashover is forced between the metal band (18) and the first end (4) without any physical contact taking place between the first end (4) and the metal band (18), thus preventing any friction damage to the elements because the pitch of the blade (10) means that they are independently mobile.

The second end (3) of the first bar (2) is located at a distance of between 0.5 and 30 mm, preferably between 8 and 15 mm, from the gutter (12) of the nacelle (13). This therefore prevents friction between both parts as the gutter (12) is immobile, whilst the second end (3) is joined to the hub (21) and is therefore mobile.

The invention claimed is:

1. Lightning transmission element, configured to be installed on a wind turbine, characterised in that it comprises:
   first conduction means formed by a first bar (2) of conductor material that comprises:
   a first end (4) that has a first front surface opposite a metal band (18) located at the root of each blade (10) of the wind turbine, at a first distance to ensure a flashover from the metal band (18) to the first end (4);
   a second end (3) that has a second front surface opposite a gutter (12) of a nacelle (13) of the wind turbine, at a second distance to ensure a flashover from the second end (3) to the gutter (12); and
   a second bar (5), of electrical insulation material capable of withstanding a temperature generated by a flashover, with said second bar (5) supporting the first bar (2) and comprising:
   a first section which includes first fixture devices for connection to a hub (21) of the wind turbine; and
   a second section which comprises second fixture devices for the connection of the first bar (2) to the second bar (5) in a substantially perpendicular position.

2. Lightning transmission element, in accordance with claim 1, characterised in that the first end (4) and the second end (3) of the first bar (2) can be removed from the central part (7) of the first bar (2).

3. Lightning transmission element, in accordance with claim 1, characterised in that the first distance ranges between 0.5 mm and 30 mm.

4. Lightning transmission element, in accordance with claim 1, characterised in that the second distance ranges between 0.5 mm and 30 mm.

5. Lightning transmission element, in accordance with claim 1, characterised in that the first distance ranges between 8 and 15 mm and the second distance ranges between 8 and 15 mm.

6. Lightning transmission element, in accordance with claim 1, characterised in that the first conduction means are made of a material selected from copper, steel and combinations of the same.

7. Lightning transmission element, in accordance with claim 1, characterised in that the first fixture devices comprise a base plate (8) for connection to the hub (21) of the wind turbine.

8. Non-contact lightning transmission system, configured to be assembled on wind turbines which comprise a tower (26), a nacelle (13), and a yaw ring (20) to allow the rotation of the nacelle (13) on the tower (26), with said system comprising:
    second conduction means (25) for conducting lightning from a tip of each blade (10) of the wind turbine to a stiffening beam (17) which constitutes the central core of the blade (10);
    third conduction means (1, 27, 28) for conducting lightning from the stiffening beam (17) of the blade (10) to the yaw ring (20) through the structure of the nacelle (13); and
    fourth conduction means (26) for conducting lightning to earth from the yaw ring (20) along the tower (16) of the wind turbine;
characterised in that
    the third conduction means (1, 27, 28) comprise:
    a first conductor (27) from the stiffening beam (17) of the blade (10) to a metal band (18) located on the root of each blade;
    a second conductor (28) through a gutter (12) and the nacelle (13) to the yaw ring (20); and
    a lightning transmission element (1) in accordance with claim 1.

9. Non-contact lightning transmission system, configured to be assembled on wind turbines which comprise a tower (26), a nacelle (13), and a yaw ring (20) to allow the rotation of the nacelle (13) on the tower (26), with said system comprising:
    second conduction means (25) for conducting lightning from a tip of each blade (10) of the wind turbine to a stiffening beam (17) which constitutes the central core of the blade (10);
    third conduction means (1, 27, 28) for conducting lightning from the stiffening beam (17) of the blade (10) to the yaw ring (20) through the structure of the nacelle (13); and
    fourth conduction means (26) for conducting lightning to earth from the yaw ring (20) along the tower (16) of the wind turbine;
characterised in that
    the third conduction means (1, 27, 28) comprise:
    a first conductor (27) from the stiffening beam (17) of the blade (10) to a metal band (18) located on the root of each blade;
    a second conductor (28) through a gutter (12) and the nacelle (13) to the yaw ring (20); and
    a lightning transmission element (1) in accordance with claim 2.

10. Non-contact lightning transmission system, configured to be assembled on wind turbines which comprise a tower (26), a nacelle (13), and a yaw ring (20) to allow the rotation of the nacelle (13) on the tower (26), with said system comprising:
    second conduction means (25) for conducting lightning from a tip of each blade (10) of the wind turbine to a stiffening beam (17) which constitutes the central core of the blade (10);
    third conduction means (1, 27, 28) for conducting lightning from the stiffening beam (17) of the blade (10) to the yaw ring (20) through the structure of the nacelle (13); and
    fourth conduction means (26) for conducting lightning to earth from the yaw ring (20) along the tower (16) of the wind turbine;
characterised in that
    the third conduction means (1, 27, 28) comprise:
    a first conductor (27) from the stiffening beam (17) of the blade (10) to a metal band (18) located on the root of each blade;
    a second conductor (28) through a gutter (12) and the nacelle (13) to the yaw ring (20); and
    a lightning transmission element (1) in accordance with claim 3.

11. Non-contact lightning transmission system, configured to be assembled on wind turbines which comprise a tower (26), a nacelle (13), and a yaw ring (20) to allow the rotation of the nacelle (13) on the tower (26), with said system comprising:
    second conduction means (25) for conducting lightning from a tip of each blade (10) of the wind turbine to a stiffening beam (17) which constitutes the central core of the blade (10);
    third conduction means (1, 27, 28) for conducting lightning from the stiffening beam (17) of the blade (10) to the yaw ring (20) through the structure of the nacelle (13); and
    fourth conduction means (26) for conducting lightning to earth from the yaw ring (20) along the tower (16) of the wind turbine;
characterised in that
    the third conduction means (1, 27, 28) comprise:
    a first conductor (27) from the stiffening beam (17) of the blade (10) to a metal band (18) located on the root of each blade;
    a second conductor (28) through a gutter (12) and the nacelle (13) to the yaw ring (20); and
    a lightning transmission element (1) in accordance with claim 4.

12. Non-contact lightning transmission system, configured to be assembled on wind turbines which comprise a tower (26), a nacelle (13), and a yaw ring (20) to allow the rotation of the nacelle (13) on the tower (26), with said system comprising:
    second conduction means (25) for conducting lightning from a tip of each blade (10) of the wind turbine to a stiffening beam (17) which constitutes the central core of the blade (10);
    third conduction means (1, 27, 28) for conducting lightning from the stiffening beam (17) of the blade (10) to the yaw ring (20) through the structure of the nacelle (13); and
    fourth conduction means (26) for conducting lightning to earth from the yaw ring (20) along the tower (16) of the wind turbine;

characterised in that
the third conduction means (1, 27, 28) comprise:
a first conductor (27) from the stiffening beam (17) of the blade (10) to a metal band (18) located on the root of each blade;
a second conductor (28) through a gutter (12) and the nacelle (13) to the yaw ring (20); and
a lightning transmission element (1) in accordance with claim 5.

13. Non-contact lightning transmission system, configured to be assembled on wind turbines which comprise a tower (26), a nacelle (13), and a yaw ring (20) to allow the rotation of the nacelle (13) on the tower (26), with said system comprising:
second conduction means (25) for conducting lightning from a tip of each blade (10) of the wind turbine to a stiffening beam (17) which constitutes the central core of the blade (10);
third conduction means (1, 27, 28) for conducting lightning from the stiffening beam (17) of the blade (10) to the yaw ring (20) through the structure of the nacelle (13); and
fourth conduction means (26) for conducting lightning to earth from the yaw ring (20) along the tower (16) of the wind turbine;
characterised in that
the third conduction means (1, 27, 28) comprise:
a first conductor (27) from the stiffening beam (17) of the blade (10) to a metal band (18) located on the root of each blade;
a second conductor (28) through a gutter (12) and the nacelle (13) to the yaw ring (20); and
a lightning transmission element (1) in accordance with claim 6.

14. Non-contact lightning transmission system, configured to be assembled on wind turbines which comprise a tower (26), a nacelle (13), and a yaw ring (20) to allow the rotation of the nacelle (13) on the tower (26), with said system comprising:
second conduction means (25) for conducting lightning from a tip of each blade (10) of the wind turbine to a stiffening beam (17) which constitutes the central core of the blade (10);
third conduction means (1, 27, 28) for conducting lightning from the stiffening beam (17) of the blade (10) to the yaw ring (20) through the structure of the nacelle (13); and
fourth conduction means (26) for conducting lightning to earth from the yaw ring (20) along the tower (16) of the wind turbine;
characterised in that
the third conduction means (1, 27, 28) comprise:
a first conductor (27) from the stiffening beam (17) of the blade (10) to a metal band (18) located on the root of each blade;
a second conductor (28) through a gutter (12) and the nacelle (13) to the yaw ring (20); and
a lightning transmission element (1) in accordance with claim 7.

* * * * *